US009444676B2

(12) United States Patent
Lindem, III et al.

(10) Patent No.: US 9,444,676 B2
(45) Date of Patent: Sep. 13, 2016

(54) EFFICIENT IDENTIFICATION OF Q-SPACE IN REMOTE LFA

(71) Applicant: Telefonaktiebolaget L M Ericsson (publ), Stockholm (SE)

(72) Inventors: Alfred C. Lindem, III, Cary, NC (US); Lars Ernstrom, Palo Alto, CA (US); Vasant Patil, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 145 days.

(21) Appl. No.: 14/480,367

(22) Filed: Sep. 8, 2014

(65) Prior Publication Data
US 2016/0072664 A1    Mar. 10, 2016

(51) Int. Cl.
| | |
|---|---|
| H04L 12/703 | (2013.01) |
| H04L 12/701 | (2013.01) |
| H04L 12/801 | (2013.01) |
| G06F 15/177 | (2006.01) |
| H04L 12/24 | (2006.01) |
| H04L 12/705 | (2013.01) |
| H04L 12/707 | (2013.01) |
| H04L 12/733 | (2013.01) |

(52) U.S. Cl.
CPC ....... *H04L 41/0663* (2013.01); *H04L 41/0668* (2013.01); *H04L 45/122* (2013.01); *H04L 45/18* (2013.01); *H04L 45/22* (2013.01); *H04L 45/28* (2013.01)

(58) Field of Classification Search
CPC ... H04L 41/0668; H04L 45/18; H04L 45/22; H04L 45/122; H04L 45/28
USPC ............... 370/216, 217, 242, 228, 231, 235; 709/223, 226, 39; 714/37
See application file for complete search history.

(56) References Cited

U.S. PATENT DOCUMENTS

| | | | |
|---|---|---|---|
| 2006/0187819 A1* | 8/2006 | Bryant | H04L 41/0668 370/216 |
| 2013/0051217 A1* | 2/2013 | So | H04L 45/18 370/217 |
| 2013/0107698 A1* | 5/2013 | Bejerano | H04L 45/122 370/218 |
| 2014/0201374 A1* | 7/2014 | Ashwood-Smith | H04L 49/70 709/226 |

(Continued)

OTHER PUBLICATIONS

""Transmission Control Protocol, Darpa Internet Program, Protocol Specification",", *Sep. 1981, 89 pages, RFC 793, Information Sciences Institute, University of Southern California, Marina del Ray, California.*

(Continued)

*Primary Examiner* — Alpus H Hsu
*Assistant Examiner* — Camquyen Thai
(74) *Attorney, Agent, or Firm* — NDWE

(57) ABSTRACT

A method is implemented by a network device in a network having a plurality of nodes. The method computes a remote loop free alternative (RLFA) next hop as a backup for a primary path next hop. The method improves RLFA computation efficiency for a Q-Space list of nodes in a Q-space for an endpoint node by reducing calculations of the loop free condition for a path from a source node to a destination node via a tunnel between the source node and the endpoint node. The method includes adding a neighbor node to a poison list where the candidate node is in the poison list and the neighbor node is not in the candidate list, the poison list indicating that a node is not a candidate for Q-Space, and determining the Q-Space list by removing nodes from poison list from the plurality of nodes.

24 Claims, 7 Drawing Sheets

(56) References Cited

U.S. PATENT DOCUMENTS

2015/0036685 A1* 2/2015 Wijnands .............. H04L 45/507
370/390
2015/0244615 A1* 8/2015 Esale .................... H04L 45/507
370/389

OTHER PUBLICATIONS

Ali, Z. , et al., ""Node-ID Based Resource Reservation Protocol (RSVP) Hello: A Clarification Statement,"", Network Working Group, Request for Comments: 4558, Category: Standards Track, Jun. 2006, 8 pages.
Andersson, L. , et al., "LDP Specification", Network Working Group, Request for Comments: 5036, Oct. 2007, 135 pages.
Awduche, et al., "RSVP-TE: Extensions to RSVP for LSP Tunnels", Network Working Group Request for Comments: 3209, Dec. 2001, 61 pages, The Internet Society.
Babiarz, J. , et al., "Configuration Guidelines for DiffServ Service Classes", Network Working Group, Request for Comments: 4594, The Internet Society, (Aug. 2006), 57 pages.
Baker, F. , "A Differentiated Services Code Point (DSCP) for Capacity-Admitted Traffic", Internet Engineering Task Force (IETF), Request for Comments: 5865, IETF Trust, (May 2010), 14 pages.
Baker, F. , et al., "Management Information Base for the Differentiated Services Architecture", Network Working Group, Request for Comments: 3289, The Internet Society, (May 2002), 116 pages.
Berger, L. , "Generalized Multi-Protocol Label Switching (GMPLS) Signaling Resource ReserVation Protocol-Traffic Engineering (RSVP-TE)", Network Working Group; RFC 3473; Jan. 2003; 42 pages.
Bernet, Y. , et al., "An Informal Management Model for Diffserv Routers", Network Working Group, Request for Comments: 3290, The Internet Society, (May 2002), 56 pages.
Black, D. , et al., "Per Hop Behavior Identification Codes," Jun. 2001, 8 pages, Network Working Group, Request for Comments: 3140, The Internet Society.
Black, D. , "Differentiated Services and Tunnels", Network Working Group, Request for Comments: 2983, The Internet Society(Oct. 2000), 14 pages.
Blake, S. , et al., "An Architecture for Differentiated Services", Network Working Group, Request for Comments 2475, The Internet Society, (Dec. 1998), 37 pages.
Borman, D. , et al., "IPv6 Jumbograms", Network Working Group, Request for Comments: 2675, The Internet Society, (Aug. 1999), 9 pages.
Braden, R. , et al., ""Resource ReSerVation Protocol (RSVP)—Version I Functional Specification",", Network Working Group Request for Comments: 2205, Sep. 1997, 100 pages.
Chan, K. , et al., "Differentiated Services Quality of Service Policy Information Base", Network Working Group, Request for Comments: 3317, The Internet Society, (Mar. 2003), 96 pages.
Charny, A. , et al., "Supplemental Information for the New Definition of the EF PHB (Expedited Forwarding Per-Hop Behavior)", Network Working Group, Request for Comments: 3247, The Internet Society, (Mar. 2002), 24 pages.
Coltun, R. , et al., "OSPF for IPv6", Network Working Group, Request for Comments: 5340, Jul. 2008, 95 pages.
Davie, B. , et al., "An Expedited Forwarding PHB (Per-Hop Behavior)", Network Working Group, Request for Comments: 3246, The Internet Society, (Mar. 2002), 16 pages.
Deering, et al., "Internet Protocol, Version 6 (IPv6) Specification", Network Working Group, Request for Comments: 2460, The Internaet Society, (Dec. 1998), 39 pages.
Eggert, L. , et al., "Unicast UDP Usage Guidelines for Application Designers", Network Working Group, Request for Comments: 5405, IETF Trust, (Nov. 2008), 27 pages.

Fenner, B. , et al., "Management Information Base for the User Datagram Protocol (UDP)", Network Working Group, Request for Comments: 4113, The Internet Society, (Jun. 2005), 19 pages.
Grossman, D. , "New Terminology and Clarification for Diffserv", Network Working Group, Request for Comments: 3260, The Internet Society, (Apr. 2002), 10 pages.
Hedrick, C. , "Routing Information Protocol", Network Working Group, Request for Comments: 1058, (Jun. 1988), 34 pages.
Heinanen, J. , et al., "Assured Forwarding PHB Group", Jun. 1999, 11 pages, Network Working Group, Request for Comments: 2597, The Internet Society.
Housley, "Using Advanced Encryption Standard (AES) CCM Mode with IPsec Encapsulating Security Payload (ESP)", Network Working Group, Request for Comments: 4309, The Internet Society, (Dec. 2005), 14 pages.
Kent, et al., "Security Architecture for the Internet Protocol", Network Working Group, Request for Comments: 4301, The Internet Society, (Dec. 2005), 102 pages.
Kompella, et al., "Procedures for Modifying the Resource reSerVation Protocol (RSVP)", Network Working Group, Request for Comments: 3936, The Internet Society, (Oct. 2004), 7 pages.
Malkin, G. , "RIP Version 2", Network Working Group, Request for Comments: 2453, Nov. 1998, 40 pages.
Malkin, et al., "RIPng for IPv6", Network Working Group, Request for Comments: 2080, (Jan. 1997) 19 pages.
Moy, J. , Network Working Group, Request for Comments: 2328, OSPF Version 2, Apr. 1998, 245 pages.
Nichols, K. , et al., "Definition of Differentiated Services Per Domain Behaviors and Rules for their Specification," Apr. 2001, 24 pages, Network Working Group, Request for Comments: 3086, The Internet Society.
Nicols, K. , et al., "Definition of the Differentiated Services Field (DS Field) in the IPv4 and IPv6 Headers", Network Working Group, Request for Comments: 2474, The Internet Society, (Dec. 1998), 20 pages.
Oran, David , "OSI ISIS Intradomain Routing Protocol", Network Working Group, Request for Comments: 1142, (Feb. 1990), 157 pages.
Polk et al., "A Resource Reservation Protocol (RSVP) Extension for the Reduction of Bandwith of a Reservation Flow", Network Working Group, Request for Comments: 4495, The Internet Society, (May 2006), 21 pages.
Postel, J. , ""User Datagram Protocol", ", Aug. 28, 1980, 3 pages, RFC 768.
Rekhter, Y. , et al., "A Border Gateway Protocol 4 (BGP-4)", Network Working Group, Request for Comments: 4271, (Jan. 2006), 105 pages.
Shenker, S. , et al., "Specification of Guaranteed Quality of Services", Network Working Group; RFC 2212; Sep. 1997; 20 pages.
Socolofsky, T. , et al., "A TCP/IP Tutorial", Network Working Group, Request for Comments: 1180, (Jan. 1991), 28 pages.
Wroclawski, J. , "Specification of the Controlled-Load Network Element Service", Network Working Group, Request for Comments: 2211, (Sep. 1997), 19 pages.
Wroclawski, J. , "The Use of RSVP with IETF Integrated Services", Network Working Group, Request for Comments:22010, (Sep. 1997), 33 pages.
Yang, et al., "A Lightweight IP Fast Reroute Algorithm with Tunneling," IEEE Interantional Conference on Communications (ICC), IEEE, May 23, 2010, pp. 1-5.
Atlas, et al., "Basic Specification for IP Fast Reroute: Loop-Free Alternates", RFC 5286, IP Fast Reroute: Loop-Free Alternates, Sep. 2008, 31 pages.
Bryant, S. , et al., "Remote LFA FRR draft-ietf-rtgw-remote-lfa-04", Standards Track; http://tools.ietf.org/html/draft-ietf-rtgwg-remote-lfa-04; Nov. 2013; 24 pages.

* cited by examiner

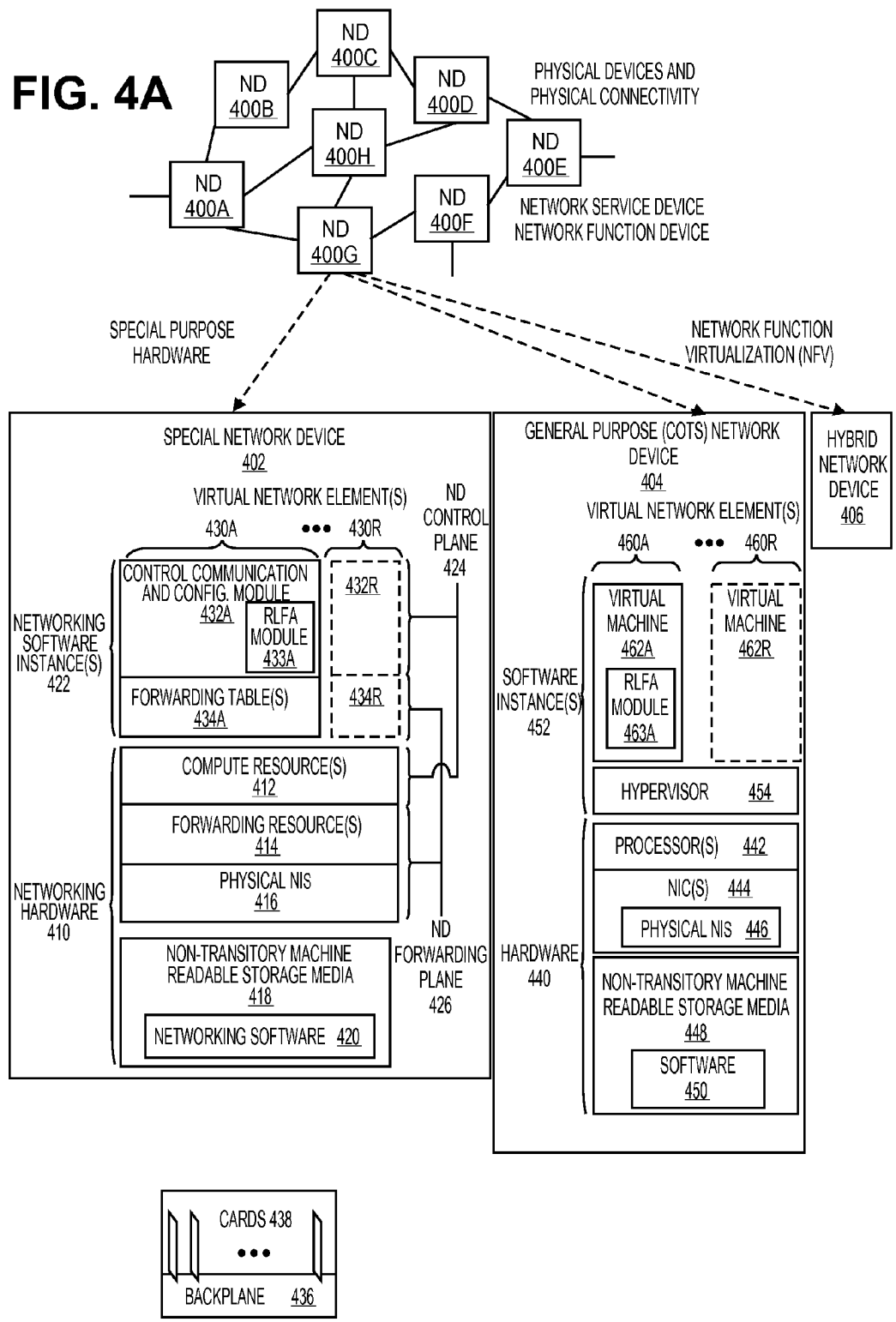

EFFICIENT IDENTIFICATION OF Q-SPACE IN REMOTE LFA

FIELD

Embodiments of the invention relate to the field of backup path computation. Specifically, the embodiments relate to a method for computing a remote loop free alternative (RLFA) path by employing a process to more efficiently identify the Q-Space of a node.

BACKGROUND

The combination of the Internet Protocol (IP) and multi-protocol label switching (MPLS) Fast Reroute (FRR) technologies address the problem with the long time it takes routing protocols to converge across networks. The problem is addressed by providing backup paths in the forwarding plane, which are used when network failures occur, while the routing protocol is reconverging. These technologies are important due to the increased use of IP transport for real time services such as video, voice and TV and the increasing number of web services which all are expected to work without disruption.

The standard approach used in existing technologies, such as open shortest path first (OSPF), intermediate system intermediate system (ISIS), label distribution protocol (LDP) loop free alternative (LFA), maximally redundant trees (MRT), border gateway protocol (BGP) FRR, is to gather network information using a routing/signaling protocol and based on that information compute the backup paths necessary to prepare for failures of adjacent links or nodes, and then to pre-provision the forwarding plane with those back-up paths. The forwarding plane is then able to react to a failure event and switch from a primary path to a pre-provisioned back-up path without waiting for the routing protocol to gather updated network information and reconverge. Instead each of the network nodes switch from the primary path to the backup path and continue to utilize the backup path until the completion of the reconvergence of the network resulting in the calculation of new primary paths.

If an algorithm utilized in conjunction with these technologies to find a backup path cannot find a LFA backup path from the source node to the destination node (e.g., via the process defined in RFC 5286, then an alternative process can be utilized a way to find a remote-LFA (e.g., via IETF draft Remote LFA FRR, published Nov. 22, 2013). However, the process of pre-provisioning these backup paths and in particular the remote LFA backup paths is compute and resource intensive. Reducing the compute resources required reduces the cost of the requisite networking equipment and reduces downtime from possible network failures.

SUMMARY

A method is implemented by a network device in a network having a plurality of nodes. The method to compute a remote loop free alternative (RLFA) next hop as a backup for a primary path next hop. The method improves RLFA computation efficiency for a Q-Space list of nodes in a Q-space for an endpoint node by reducing calculations of the loop free condition for a path from a source node to a destination node via a tunnel between the source node and the endpoint node. The method includes selecting a next candidate next node having a least distance to the endpoint node or destination node from a candidate list, selecting a next neighbor node of the candidate node, adding a neighbor node to a poison list where the candidate node is in the poison list and the neighbor node is not in the candidate list, the poison list indicating that a node is not a candidate for Q-Space and determining the Q-Space list by removing nodes from poison list from the plurality of nodes.

A network device is in a network having a plurality of nodes. The network device is configured to execute a method to compute a remote loop free alternative (RLFA) next hop as a backup for a primary path next hop. The method improves RLFA computation efficiency for a Q-Space list of nodes in a Q-space for an endpoint node by reducing calculations of the loop free condition for a path from a source node to a destination node via a tunnel between the source node and the endpoint node. The network device includes a non-transitory machine-readable storage medium to store an RLFA module, and a network processor communicatively coupled to the non-transitory machine-readable storage medium. The network processor is configured to execute the RLFA module. The RLFA module is configured to select a next candidate next node having a least distance to the endpoint node or destination node from a candidate list, to select a next neighbor node of the candidate node, add a neighbor node to a poison list where the candidate node is in the poison list and the neighbor node is not in the candidate list, the poison list indicating that a node is not a candidate for Q-Space, and to determine the Q-Space list by removing nodes from poison list from the plurality of nodes.

A control plane device is configured to implement at least one centralized control plane for a software defined network (SDN). The centralized control plane is configured to execute a method to compute a remote loop free alternative (RLFA) next hop as a backup for a primary path next hop. The method improves RLFA computation efficiency for a Q-Space list of nodes in a Q-space for an endpoint node by reducing calculations of the loop free condition for a path from a source node to a destination node via a tunnel between the source node and the endpoint node. The control plane device includes a non-transitory machine-readable storage medium to store an RLFA module, and a computer processor communicatively coupled to the non-transitory machine-readable storage medium. The computer processor executes the RLFA module. The RLFA module is configured to select a next candidate next node having a least distance to the endpoint node or destination node from a candidate list, to select a next neighbor node of the candidate node, add a neighbor node to a poison list where the candidate node is in the poison list and the neighbor node is not in the candidate list, the poison list indicating that a node is not a candidate for Q-Space, and to determine the Q-Space list by removing nodes from poison list from the plurality of nodes.

A computing device implements a plurality of virtual machines for implementing network function virtualization (NFV). A virtual machine from the plurality of virtual machines is configured to execute a method to compute a remote loop free alternative (RLFA) next hop as a backup for a primary path next hop. The method improves RLFA computation efficiency for a Q-Space list of nodes in a Q-space for an endpoint node by reducing calculations of the loop free condition for a path from a source node to a destination node via a tunnel between the source node and the endpoint node. The computing device includes a non-transitory machine-readable storage medium to store the virtual machine and an RLFA module, and a computer processor communicatively coupled to the non-transitory machine-readable storage medium. The computer processor executes the virtual machine. The virtual machine executes the RLFA module. The RLFA module is configured to select a next candidate next node having a least distance to the endpoint node or destination node from a candidate list, to select a next neighbor node of the candidate node, add a neighbor node to a poison list where the candidate node is in the poison list and the neighbor node is not in the candidate list, the poison list indicating that a node is not a candidate for Q-Space, and to determine the Q-Space list by removing nodes from poison list from the plurality of nodes.

BRIEF DESCRIPTION OF THE DRAWINGS

The invention may best be understood by referring to the following description and accompanying drawings that are used to illustrate embodiments of the invention. In the drawings:

FIG. 4A illustrates connectivity between network devices (NDs) within an exemplary network, as well as three exemplary implementations of the NDs, according to some embodiments of the invention.

FIG. 4B illustrates an exemplary way to implement the special-purpose network device 402 according to some embodiments of the invention.

DESCRIPTION OF EMBODIMENTS

Figure 1:
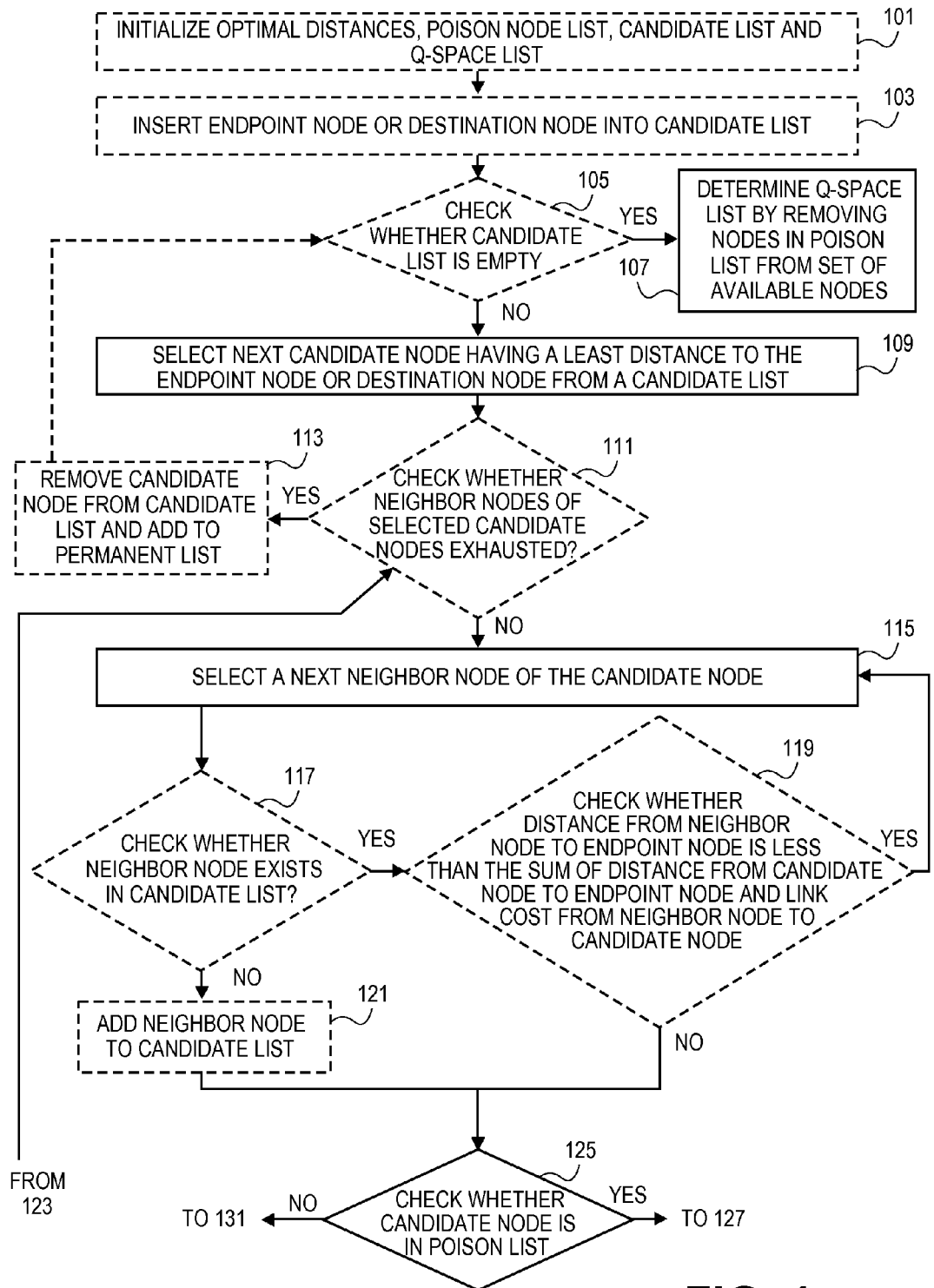
FIG. 1 is a diagram of one embodiment of a process for calculating Q-space for a given destination or endpoint.
Figure 1:
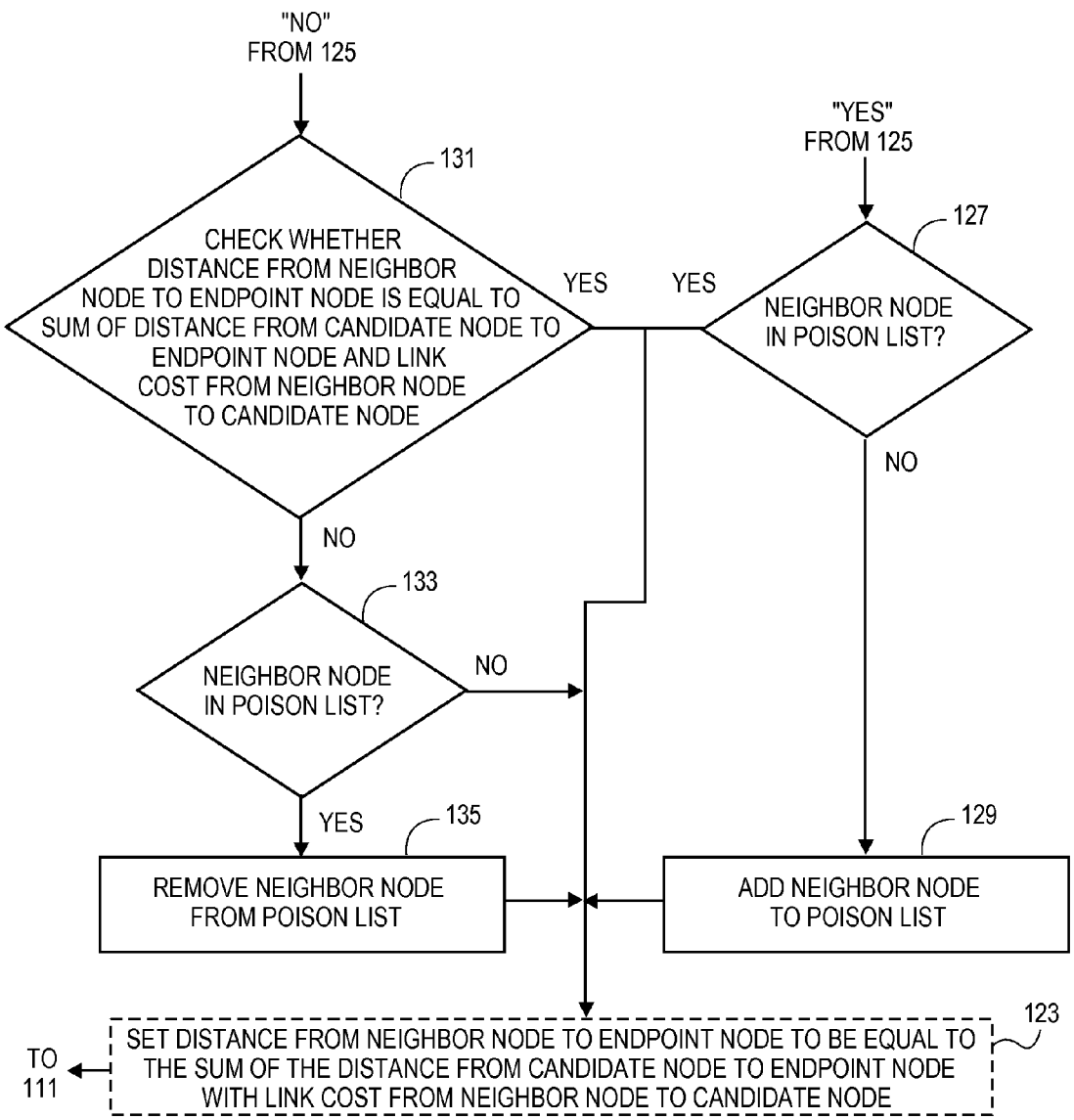

The following description describes methods and apparatus for efficient remote LFA computation. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Terminology

Figure 2:
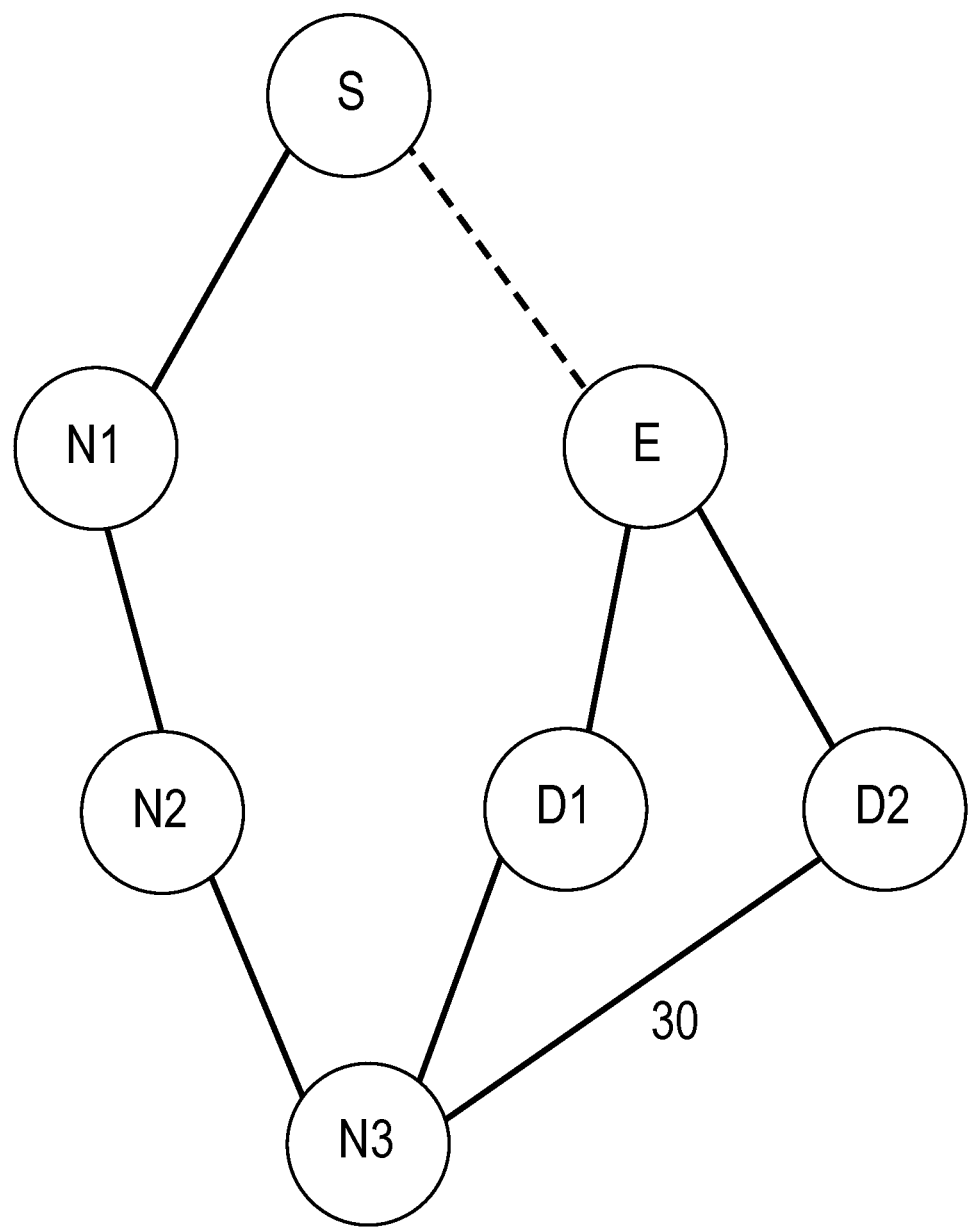
FIG. 2 is a diagram of an example network topology illustrating the accuracy of the process described herein for improved efficiency.

The embodiments refer to the following terms and concepts related to the computation of remote LFAs, FIG. 2 can be referenced for examples for some of the terms:

Protected Link: Link being protected in case of link protection. For example, link between source node (S) and endpoint node (E) in FIG. 2.

Protected Node: Node being protected in case of node protection. For example, endpoint node (E) can be protected in FIG. 2.

Unprotected node: Any node/prefix in the network that does NOT have an LFA/backup.

Link Protecting P-Space: P-Space is the set of routers reachable from a specific router (Source/PLR) without any path (including equal cost path splits) transiting the protected link.

Node Protecting P-Space: P-Space is the set of routers reachable from a specific router (Source/PLR) without any path (including equal cost path splits) transiting the node being protected, for example endpoint node (E) in the example of FIG. 2.

Extended P-Space: A specific router's extended P-Space is the union of the P-Spaces of each of its neighbors, for example the neighbor node (N1) in FIG. 2.

Link Protecting Q-Space: Q-Space is the set of routers from which a specific router (router at the other end of protected link) can be reached without any path (including equal cost path splits) transiting the protected link.

Node Protecting Q-Space: Q-Space is the set of routers from which a specific router (unprotected destination router) can be reached without any path (including equal cost path splits) transiting the protected node.

PQ node: A router, which is a member of both the (extended) P-Space and the Q-Space.

Repair tunnel: A tunnel established for the purpose of providing a virtual neighbor, which is a Loop Free Alternative.

Remote LFA: The use of a PQ node, through a repair tunnel, rather than a neighbor of the repairing node as the nexthop in an LFA repair.

Overview

In a network consisting of a large number of routers, it is of importance that efficient algorithms are applied in the routers for the computation of the backup paths. Inefficient algorithms will limit the scale of the protection domain, i.e., limit the number of routers that can participate in a routing domain where IP FRR protection is deployed. For link protecting remote LFA (i.e., a remote LFA computation to protect against failure of a particular link), some remote LFA computation algorithms propose to compute a reverse shortest path first (SPF) from the network device functioning as the source computing router or source node (S), to conclude that the path from a source node to a destination node does not go through the link being protected to reach the node at the other end of link being protected (E). The embodiments described herein below in this document eliminate the requirement for reverse SPF computation from the source computing router or source node (S) to find a link protecting Q-Space. Also, the described embodiments can be used to find a node protecting Q-space while doing reverse SPF from every unprotected destination node.

The prior art for computation of remote LFAs have disadvantages in computational efficiency due to the requirement to compute a reverse SPF. To compute a link protecting remote LFA to a node X for a given link to be protected, the process identifies a node that is a PQ node for the source node. To identify a PQ node, the P-Space and Q-space must be known, that is the set of nodes in each of these spaces must be computed. For a node to be in Q space, the inequality (loop-free condition) Opt_Dist(X, E)<Opt_Dist(X, S)+Opt_Dist(S, E) must hold true, where the function Opt_Dist(a, b) determines an optimal distance between node a and b, where an optimal distance is a shortest distance between the nodes with a given topology. In these equations E is the node at the other end of the link for which the source node S is calculating a remote LFA. This inequality ensures that the shortest path from X to E does not traverse the protected link. The prior art algorithms performs the following steps to get each of the optimal distances in the inequality used to check the loop-free condition:

(1) Opt_Dist(X, E)→Do reverse SPF from E.
(2) Opt_Dist(X, S)→Do reverse SPF from S.
(3) Opt_Dist(S, E)→Forward SPF from S.

However, this prior art process is inefficient and the embodiments describe herein below improve efficiency by avoiding the extra overhead of computing a reverse SPF from the computing router or source node (S) and the overhead of maintaining this information. The overhead of maintaining this information will be significant when the number of routers or nodes in the network domain is high.

The embodiments of the invention modify the prior art process to get the same result with less computational and memory storage resource requirements. The embodiments work on the principle that it is not required to do reverse SPF from source(S) to determine whether a node is in Q space or not. This means that the embodiments do not need to calculate Opt_Dist(X, S) for every node X in the network domain. The embodiments provide an alternate process to determine whether the Opt_Dist(X, E) traverse the protected link or not. This is done as part of the reverse SPF from E, that is, while calculating Opt_Dist(X, E).

In the present process, when the computation of the reverse SPF from E is performed, the process marks a node as poisoned for which Opt_Dist(X, E) goes via S when link protecting remote LFA is desired. If the node is not poisoned, it is a candidate for Q space. The same principle is used when a node-protecting remote LFA from S is required for an unprotected destination D. In this case the process will do reverse SPF from D instead of from E as is done in the link protection case. To conclude that a node X belongs to the node-protecting Q-Space the inequality Opt_Dist (X, D)<Opt_Dist (X, E)+Opt_Dist (E, D) must hold true. E is the node being protected. To ensure this, the process 'poisons' (i.e., marks or tracks) the node if the shortest path from X to D goes via E. If the node is not poisoned, then it is a candidate to be in the node-protecting Q space.

The embodiments provide advantages over the prior art, because the embodiments provide a process that eliminates the overhead of doing reverse SPF from the source node S and the overhead of maintaining the optimal distance from every node in the network domain to the source node S. This overhead is significant when the number of network devices such as routers in the network domain is high.

The embodiments encompass an apparatus including hardware for the processing of route computations and forwarding of data packets/frames. One or more processing units are used to compute the primary and backup routing paths according to the algorithm provided by the method described herein below. One or more processing units are used to forward packets/frames according to the primary/backup paths provided by the route computation. A mechanism is used to communicate the primary path and backup routing paths from the processing unit(s) performing the computation to the unit(s) performing the forwarding of packets/frames. The forwarding processing unit(s) will switch to backup paths in case of applicable failure situations. Specific example embodiments consistent with this general architectural design are described herein below with regard to FIGS. 3-5.

The embodiments provide a process that modifies the requirements of prior art implementations to make the process more efficient without compromising the result. As discussed herein above, to compute a remote LFA for a link, the process must identify a PQ node. The process examines each node (X) in a network domain to determine whether it is in the PQ space. For each node X to be in Q space the inequality Opt_Dist(X, E)<Opt_Dist(X, S)+Opt_Dist(S, E) must hold true. Where E is the node (referred to herein as the endpoint node) at the other end of the link for which source node S is computing a remote LFA, where a remote LFA utilizes a tunnel to the endpoint node E and calculates a route to the destination node (D) as a backup path where an LFA directly from the source node (S) cannot be found. This inequality ensures that the shortest path from node X to the endpoint node E does not traverse the source node S, since this would result in a loop. As discussed above, the prior art does the following to get each of the optimal distances in the inequality condition:

(1) Opt_Dist(X, E)→Do reverse SPF from E.
(2) Opt_Dist(X, S)→Do reverse SPF from S.
(3) Opt_Dist(S, E)→Forward SPF from S.

The embodiments provide a process where the same result can be achieved without doing reverse SPF from source node (S). In the embodiments provided herein, instead of computing the reverse SPF from source node S, while doing the preceding reverse SPF from a protecting link neighbor endpoint node E, the process marks a node as being in a poison state under the conditions set forth below. To start the process, the process marks endpoint node E as not poisoned.

Then, links are added to the path from a node X to the endpoint node E to generate a candidate path T from node X to endpoint node E. Whenever a node Y is added into a candidate list utilized in the construction of the candidate path T, the poison state of the node Y is determined using the following conditions set forth in the following sequence: (1) if Y is not the computing source node (S) and Y already exists in the candidate list (which is a list maintained of those candidate nodes in the network adjacent to already examined nodes), (2) if the calculated cost (Y→X→E) is less than the existing cost, Y will inherit X's poison state, (3) if the calculated cost (Y→X→E) is greater than existing cost, then do nothing, (4) if the calculated cost (Y→X→E) is equal to existing cost, then if X is poisoned, then Y will inherit X's poison state. If X is not poisoned, do nothing. (5) If Y is not the computing source node (S) and Y is not in the candidate list, then Y will inherit X's poison state. (6) If Y is the computing source node (S), then poison Y irrespective of X's poison state.

In some embodiments, instead of link protection the process provides node protection for the endpoint node. While doing reverse SPF from an unprotected destination D, the process marks a node's poison state as set forth in the sequence below. To start the computation, the process marks node D as not poisoned Links are added to the path from a node X to the destination node D to generate a candidate path T from node X to destination node D. Whenever a node Y is added into the candidate list, the poison state of the node Y is determined using the following conditions: (1) if Y is not the computing source node (S) and Y already exists in the candidate list, (2) if the calculated cost (Y→X→E) is less than the existing cost, then Y will inherit X's poison state, (3) if the calculated cost (Y→X→E) is greater than existing cost, then do nothing. (4) If the calculated cost (Y→X→E) is equal to existing cost, and if X is poisoned, then Y will inherit X's poison state. If X is not poisoned, then do nothing. (5) If Y is NOT the computing source node (S) and Y is not in the candidate list, Y will inherit X's poison state. (6) If Y is the computing source node (S), then poison Y irrespective of X's poison state. (7) If Y is the node at the other end of the link for which remote LFA is being calculated that is endpoint node E (E), then poison Y irrespective of X's state. These steps are done only if the remote LFA is desired to be node protecting.

After the reverse SPF for E or D using the process described above, every node that is not poisoned is in Q space. Every such node X can be considered as in Q space as soon as they are selected from the top of the candidate list. An example application of this process is described with relation to FIG. 1.

FIG. 1 is a flowchart of one embodiment of the process for identifying the Q-space for a given node in the network. The illustrated process is provided by way of example and not by way of limitation. Those skilled in the art would understand that the principles, functions and steps described herein are also applicable to other implementations. In one embodiment, the process begins by initializing the optimal distances, poison node list, candidate list and Q-space list, which are each data structures for assisting in the computation (Block 101). The optimal distances are the set of values indicating the best optimal distance computed between two nodes during the computation process. The poison list identifies the set of nodes that have been labeled as poisoned during the process and is initialized as an empty set. The candidate list is a set of nodes that have not yet been processed and is initialized as an empty set. Similarly, the Q-space list is the list of those nodes that are found to be in the Q-space of a given source node, this list is initialized as an empty set. Where link protection is being determined, then the poison list will be initialized with an endpoint node (E) and for node protection the destination node (D) is in the poison list. The source node will also be placed in the poisoned list. As used herein a node is 'poisoned' where it is not a candidate for Q-space.

The process then inserts the endpoint node (E) and/or destination node (D) into the candidate list (Block 103). Inserting these nodes serves as a starting point for traversing the network topology. Where link protection is being determined, then only the endpoint node E is inserted, however where node protection is being determined then the destination node D is inserted. A check is then made whether the candidate node is empty (Block 105). Nodes are removed from the candidate list as they are processed, so if the process has completed then the candidate list will be empty. Once the list is empty a determination of the Q-space list can be made by removing nodes in the current poison list from the set of available nodes in the network domain topology (Block 107). The poison list represents those nodes that are not in the Q-space thus all remaining nodes in the network domain topology are in the Q-space.

If the candidate list is not empty, then the process selects a next candidate node from the candidate list that has the least distance to the endpoint node or destination node (Block 109). Whether the distance is measured from the endpoint node E or destination node D, the process proceeds in an outward manner from these nodes. The process starts from the endpoint node E for the link protection and from the destination node D for the node protection.

A check is then made whether neighbor nodes of the selected candidate have been exhausted (Block 111). The process examines each of the neighbors of a candidate node before examining those of another candidate node. If the candidate node's neighbors have been exhausted, then the process removes the candidate node from the list and adds it to the permanent list that tracks the set of already processed nodes such that no node can be added a second time to the candidate list (Block 113).

If the candidate nodes' neighbor nodes have not been exhausted, then the process selects a next neighbor node (Block 115). The neighbor nodes can be selected in any order and based on any criteria such that each node is considered. A check is then made whether the neighbor node exists in the candidate list (Bloc 117). In other words, the check determines whether the neighbor node is already slated for further consideration in the process. If the neighbor node already exists in the candidate list, then a check is made whether the distance from the selected neighbor node to an endpoint node is less than the sum of a distance and a link cost, the first distance from the candidate node to the endpoint node and the second link cost from neighbor node to candidate node (Block 119). This can also be expressed as a check whether Opt_Dist(NN, E)<Opt_Dist(CN, E)+Link Cost(NN, CN), where NN is the neighbor node and CN is the candidate node. This test checks whether the neighbor node provides a shorter path to the endpoint than the candidate node has previously been shown to have in which case then the neighbor node is further processed. However, if the path is not shorter, then the path to the neighbor node can be discarded and a check whether further neighbor nodes remain to be processed (Block 115) is made. The path to the neighbor node can be considered to be 'discarded' at this stage however if a shorter path is later found for the same neighbor node then it will be further considered.

If the neighbor node does provide a shorter path to the endpoint, then the process adds the neighbor node to the candidate list (Block 121). In cases where the neighbor node was not found in the candidate list (Block 117) it can also be added to the candidate list. In some embodiments, the process may first check whether the neighbor node is in the permanent list to determine whether the neighbor node has already been processed as a candidate node. After the addition of the neighbor node to the candidate list the process checks whether the candidate node is in the poison list (Block 125).

If the candidate node is not in the poison list, then a check is made whether the distance from the neighbor node to the endpoint node is equal to the sum of the distance from the candidate node to the endpoint node and the link cost from the neighbor node to the candidate node (Block 131). If the check shows that the distance is less, then the process sets the distance from the neighbor node to the endpoint node to be equal to the sum of the distance from the candidate node to the endpoint node with the link cost from the neighbor node to the candidate node (Block 123). In other words, the Opt_Dist(NN, E) is set to be equal to (=) Opt_Dist(CN, E)+Link Cost(NN, CN), where the Opt_Dist(NN, E) is tracked for future comparisons (Block 119).

If the distance is not less, then a check is made whether the neighbor node is in the poison list (Block 133). If the neighbor node is not in the poison list, then the distance from the neighbor node to the endpoint node is set (Block 123). If the neighbor node is in the poison list, then the neighbor node is removed from the poison list (Block 135) before the distance from the neighbor node to the endpoint node is set (Block 123).

After the check is then made whether the current candidate node is in the poison list (Block 125), and the candidate node is found in the poison list, then a check is made whether the neighbor is in the poison list (Block 127). If the neighbor node is in the poison list, then the process sets the distance from the neighbor node to the endpoint node (Block 123). If the neighbor node is not in the poison list, then the neighbor node is added to the poison list before the distance to the neighbor node from the endpoint node is set (Block 123). The poison list is not mutually exclusive to either the candidate list or the permanent list.

After the process sets the distance from the neighbor node to the endpoint node, the process continues to check whether there are additional neighbor nodes to be processed for the current candidate node (Block 111). The previous neighbor node can be 'discarded' or similarly marked as processed with relation to the current candidate node after the determination of whether it is to be added to the poison list.

The process thus continues until all neighbor nodes for each candidate node have been processed. Once all candidate nodes and all of their neighbor nodes have been processed as set forth above the process completes with the determination of the Q-space list (Block 107). One skilled in the art would understand that this iterative process can also be implemented in other computationally equivalent manners including using alternative iterative processing, parallel processing or recursive processing techniques.

FIG. 2 is a diagram of one embodiment of a network topology for a network domain for illustrating the application of the embodiments of the process for improved efficiency in computation. The description of each node in the topology is as follows, node S is the source node or the network device carrying out the computation and functioning as a router; nodes N1, E, N2, N3, D1, D2 are other nodes in the network domain, S - - - E is the link for which source node S is computing the remote LFA. In this example it is assumed that all link costs are symmetric. All link costs are 10 unless otherwise mentioned. That is the N2 - - - N3 link cost is 30 and it is a symmetric link cost.

Using this topology the reverse SPF from E is calculated as follows, step 1: E adds itself to an rSPF list with the cost of 0 and hence E adds S, D1, D2 into the candidate list with the cost of 10 each while poisoning S. Thus, the rSPF_List={E-0} Candidate_List={S-10, D1-10, D2-10} poison_List={ } Q_Space={E} after this step. In a next step (step 2), E adds S to the rSPF list and hence adds N1 to candidate list with the cost of 20 and also N1 is poisoned because S is poisoned. The rSPF_List tracks the distance costs to each network node. Thus, the data structures after step 2 look like: rSPF_List={E-0, S-10}, Candidate_List={D1-10, D2-10, N1-20} poison_List={S, N1} and Q_Space={E}.

In the third step (Step 3): E adds D1 to the rSPF list and hence adds N3 to candidate list with cost 20. The data structures then look like: rSPF_List={E-0, S-10, D-10}, Candidate_List={D2-10, N1-20, N3-20} poison_List={S, N1} Q_Space={E, D1}. In step 4, E adds D2 to rSPF list and hence tries to add N3 to candidate list but the existing cost is less than existing calculated cost, thus nothing is done to candidate list. The data structures after step 4 look like: rSPF_List={E-0, S-10, D-10, D2-10}, Candidate_List={N1-20, N3-20} poison_List={S, N1} Q_Space={E, D1, D2}.

In step 5, E adds N1 to rSPF list and hence adds N2 to candidate list with cost 30. As N1 is poisoned, N2 is also poisoned. After step 5, the data structures look like: rSPF_List={E-0, S-10, D-10, D2-10, N1-20}, Candidate_List={N3-20, N2-30} poison_List={S, N1, N2} Q_Space={E, D1, D2}. In step 6, E adds N3 to rSPF list and hence adds N2 to the candidate list with cost 30. As the existing cost is equal to the calculated cost and N3 is not poisoned, nothing further is done to N2. After step 6, the data structures look like: rSPF_List={E-0, S-10, D-10, D2-10, N1-20, N3-20}, Candidate_List={N2-30} poison_List={S, N1, N2} Q_Space={E, D1, D2, N3}. In step 7, E adds N2 to rSPF list. Since N2 is poisoned it's not considered as being in Q_Space. After step 7, the data structures look like rSPF_List={E-0, S-10, D-10, D2-10, N1-20, N3-20, N2-30}, Candidate_List={ } poison_List={S, N1, N2} Q_Space={E, D1, D2, N3}.

The example process has been shown with relation to a link protection scenario. However, one skilled in the art would understand that this can be applied to a scenario for node protecting RLFA while doing rSPF from D1 or D2 by adjusting the process to begin from the destination node as discussed further herein above.

Proof of Correctness and Liveliness of the RLFA Process with Improved Efficiency The accuracy and liveliness of the process can also be established as set forth below. To prove that the process is correct by contradiction the proof is set forth to d show that a node not belonging to Q space is poisoned and by an alternative contradiction the is set forth that that a node belonging to Q space is not poisoned. While these proofs are set forth for the link protection embodiment, those skilled in the art would understand that the principles and arguments also apply to the node protection embodiment.

Proof of Correctness by Contradiction to Prove that Node not Belonging to Q space is Poisoned It is first assumed there exists a node X in the network such that Assumption 1: X is NOT poisoned
Assumption 2: $Opt\_Dist(X, E) >= Opt\_Dist(X, S) + Opt\_Dist(S, E)$
From assumption 2
From Assumption 1:
$Opt\_Dist(X, E) = Opt\_Dist(X, Di) + Opt\_Dist(Di, E)$ where Di is a destination node in the network domain that is not poisoned
Since Di is NOT poisoned,
$Opt\_Dist(Di, E) < Opt\_Dist(Di, S) + Opt\_Dist(S, E)$
Adding $Opt\_Dist(X, Di)$ on both sides
$Opt\_Dist(X, Di) + Opt\_Dist(Di, E) < Opt\_Dist(X, Di) + Opt\_Dist(Di, S) + Opt\_Dist(S, E) \rightarrow Opt\_Dist(X, E) < Opt\_Dist(X, S) + Opt\_Dist(S, E)$.

This contradicts assumption 2. Hence it has been proved. The nodes E and S are the endpoint node E and source node S as used throughout.

Proof of correctness by contradiction to prove that node belonging to Q space is NOT poisoned It is first assumed there exists a node X in the network such that Assumption 1: X is poisoned
Assumption 2: $Opt\_Dist(X, E) < Opt\_Dist(X, S) + Opt\_Dist(S, E)$
From assumption 1:
$Opt\_Dist(X, E) = Opt\_Dist(X, Di) + Opt\_Dist(Di, E)$ where Di is poisoned
Since Di is poisoned
$Opt\_Dist(Di, E) = Opt\_Dist(Di, S) + Opt\_Dist(S, E)$
This implies, $Opt\_Dist(X, E) = Opt\_Dist(X, Di) + Opt\_Dist(Di, S) + Opt\_Dist(S, E) \rightarrow Opt\_Dist(X, E) = Opt\_Dist(X, S) + Opt\_Dist(S, E)$, which contradicts assumption 2.

Hence it has been proved. The nodes E and S are the endpoint node E and source node S as used throughout.

Architecture Terminology

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Example Embodiments

Figure 3:
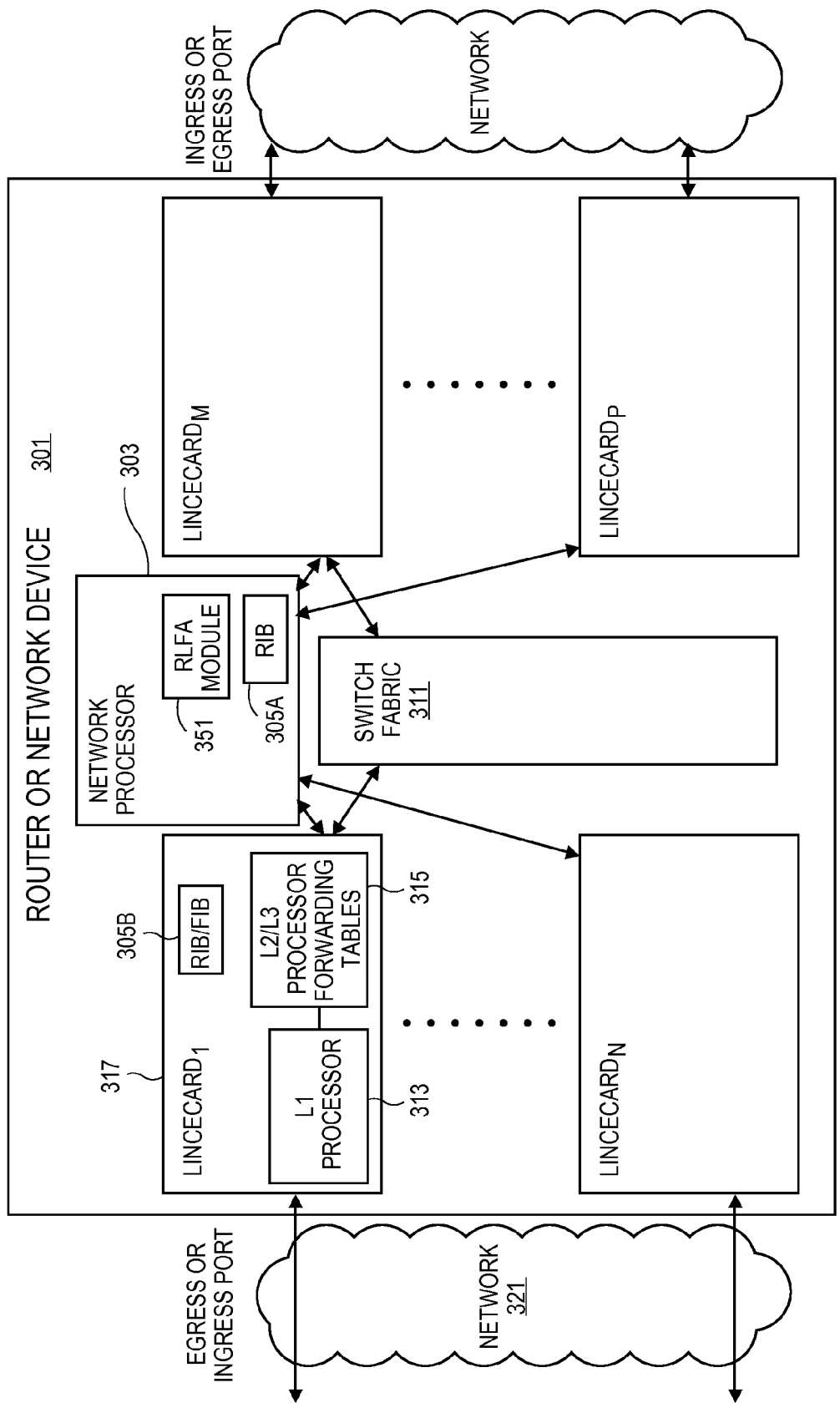
FIG. 3 is a diagram of one embodiment a network device (ND) implementing RLFA backup path computations utilizing the process for improved efficiency in calculation of the Q-space.

FIG. 3 is a diagram of one embodiment of a network device implementing the RLFA computation process in an autonomous system.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

In one embodiment, the process is implemented by a router 301 or network device or similar computing device. The router 301 can have any structure that enables it to receive data traffic and forward it toward its destination. The router 301 can include a network processor 303 or set of network processors that execute the functions of the router 301. A 'set,' as used herein, is any positive whole number of items including one item. The router 301 or network element can execute primary path computations (e.g., via OSPF) (not shown) and backup path computations via LFA computation (not shown) and RLFA, this functionality can be executed via the network processor 303 or other components of the router 301.

In particular, the RLFA functions can be implemented as modules in any combination of software, including firmware, and hardware within the router. The functions of the RLFA process that are executed and implemented by the router 301 include those described further herein above. In the illustrated example, the functions are implemented by the network processor 303 that executes an RLFA module 351 along with the routing information base 305A.

In one embodiment, the router 301 can include a set of line cards 317 that process and forward the incoming data traffic toward the respective destination nodes by identifying the destination and forwarding the data traffic to the appropriate line card 317 having an egress port that leads to or toward the destination via a next hop. These line cards 317 can also implement the routing information base or forwarding information base 305B, or a relevant subset thereof. In some embodiments, the line cards 317 can also implement or facilitate the RLFA process functions described herein above. The line cards 317 are in communication with one another via a switch fabric 311 and communicate with other nodes over attached networks 321 using Ethernet, fiber optic or similar communication links and media.

In other embodiments, the processes can be implemented by a split-architecture node, where the control plane is remote from the data/forwarding plane. In this case, the RLFA process can be carried out at any combination of the data plane nodes and the central controller. Examples of such embodiments are discussed further herein below.

FIG. 4A illustrates connectivity between network devices (NDs) within an exemplary network, as well as three exemplary implementations of the NDs, according to some embodiments of the invention. FIG. 4A shows NDs 400A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 400A, E, and F illustrates that these NDs act as ingress and egress points for the network (and thus, these NDs are sometimes referred to as edge NDs; while the other NDs may be called core NDs).

Two of the exemplary ND implementations in FIG. 4A are: 1) a special-purpose network device 402 that uses custom application-specific integrated-circuits (ASICs) and a proprietary operating system (OS); and 2) a general purpose network device 404 that uses common off-the-shelf (COTS) processors and a standard OS.

The special-purpose network device 402 includes networking hardware 410 comprising compute resource(s) 412 (which typically include a set of one or more processors), forwarding resource(s) 414 (which typically include one or more ASICs and/or network processors), and physical network interfaces (NIs) 416 (sometimes called physical ports), as well as non-transitory machine readable storage media 418 having stored therein networking software 420. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 400A-H. During operation, the networking software 420 may be executed by the networking hardware 410 to instantiate a set of one or more networking software instance(s) 422. Each of the networking software instance(s) 422, and that part of the networking hardware 410 that executes that network software instance (be it hardware dedicated to that networking software instance and/or time slices of hardware temporally shared by that networking software instance with others of the networking software instance(s) 422), form a separate virtual network element 430A-R. Each of the virtual network element(s) (VNEs) 430A-R includes a control communication and configuration module 432A-R (sometimes referred to as a local control module or control communication module) and forwarding table(s) 434A-R, such that a given virtual network element (e.g., 430A) includes the control communication and configuration module (e.g., 432A), a set of one or more forwarding table(s) (e.g., 434A), and that portion of the networking hardware 410 that executes the virtual network element (e.g., 430A).

The special-purpose network device 402 is often physically and/or logically considered to include: 1) a ND control plane 424 (sometimes referred to as a control plane) comprising the compute resource(s) 412 that execute the control communication and configuration module(s) 432A-R; and 2) a ND forwarding plane 426 (sometimes referred to as a forwarding plane, a data plane, or a media plane) comprising the forwarding resource(s) 414 that utilize the forwarding table(s) 434A-R and the physical NIs 416. By way of example, where the ND is a router (or is implementing routing functionality), the ND control plane 424 (the compute resource(s) 412 executing the control communication and configuration module(s) 432A-R) is typically responsible for participating in controlling how data (e.g., packets) is to be routed (e.g., the next hop for the data and the outgoing physical NI for that data) and storing that routing information in the forwarding table(s) 434A-R, and the ND forwarding plane 426 is responsible for receiving that data on the physical NIs 416 and forwarding that data out the appropriate ones of the physical NIs 416 based on the forwarding table(s) 434A-R.

In one embodiment, the special network device 402 can implement an RLFA module 433 or a set of such modules to improve the efficiency in calculation of backup paths across the network. The RLFA module 433A can be implemented as part of the control communication and configuration module 432A or similarly implemented as a networking software instance 422.

FIG. 4B illustrates an exemplary way to implement the special-purpose network device 402 according to some embodiments of the invention. FIG. 4B shows a special-purpose network device including cards 438 (typically hot pluggable). While in some embodiments the cards 438 are of two types (one or more that operate as the ND forwarding plane 426 (sometimes called line cards), and one or more that operate to implement the ND control plane 424 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 436 (e.g., a first full mesh coupling the line cards and a second full mesh coupling all of the cards).

Returning to FIG. 4A, the general purpose network device 404 includes hardware 440 comprising a set of one or more processor(s) 442 (which are often COTS processors) and network interface controller(s) 444 (NICs; also known as network interface cards) (which include physical NIs 446), as well as non-transitory machine readable storage media 448 having stored therein software 450. During operation, the processor(s) 442 execute the software 450 to instantiate a hypervisor 454 (sometimes referred to as a virtual machine monitor (VMM)) and one or more virtual machines 462A-R that are run by the hypervisor 454, which are collectively referred to as software instance(s) 452. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 462A-R, and that part of the hardware 440 that executes that virtual machine (be it hardware dedicated to that virtual machine and/or time slices of hardware temporally shared by that virtual machine with others of the virtual machine(s) 462A-R), forms a separate virtual network element(s) 460A-R.

The virtual network element(s) 460A-R perform similar functionality to the virtual network element(s) 430A-R. For instance, the hypervisor 454 may present a virtual operating platform that appears like networking hardware 410 to virtual machine 462A, and the virtual machine 462A may be used to implement functionality similar to the control communication and configuration module(s) 432A and forwarding table(s) 434A (this virtualization of the hardware 440 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 462A-R differently. For example, while embodiments of the invention are illustrated with each virtual machine 462A-R corresponding to one VNE 460A-R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In one embodiment, the general purpose network device 404 can implement an RLFA module 463 or a set of such modules to improve the efficiency in calculation of backup paths across the network. The RLFA module 463A can be executed by a virtual machine 462A or similarly implemented as a networking software instance 452. In other embodiments, any number of separate instances can be executed by different virtual machines 462A-R and the RLFA module 463A can be moved between the varying instances.

In certain embodiments, the hypervisor 454 includes a virtual switch that provides similar forwarding services as a physical Ethernet switch. Specifically, this virtual switch forwards traffic between virtual machines and the NIC(s) 444, as well as optionally between the virtual machines 462A-R; in addition, this virtual switch may enforce network isolation between the VNEs 460A-R that by policy are not permitted to communicate with each other (e.g., by honoring virtual local area networks (VLANs)).

The third exemplary ND implementation in FIG. 4A is a hybrid network device 406, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 402) could provide for para-virtualization to the networking hardware present in the hybrid network device 406.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 430A-R, VNEs 460A-R, and those in the hybrid network device 406) receives data on the physical NIs (e.g., 416, 446) and forwards that data out the appropriate ones of the physical NIs (e.g., 416, 446). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

Figure 4C:
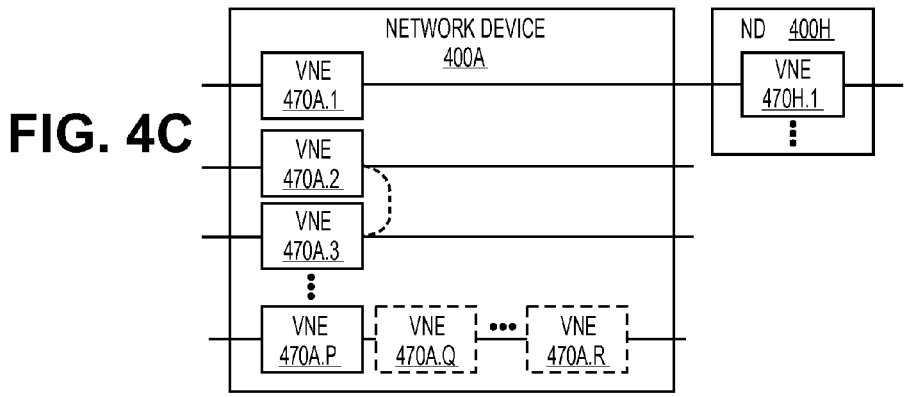
FIG. 4C illustrates various exemplary ways in which virtual network elements (VNEs) may be coupled according to some embodiments of the invention.

FIG. 4C illustrates various exemplary ways in which VNEs may be coupled according to some embodiments of the invention. FIG. 4C shows VNEs 470A.1-470A.P (and optionally VNEs 470A.Q-470A.R) implemented in ND 400A and VNE 470H.1 in ND 400H. In FIG. 4C, VNEs 470A.1-P are separate from each other in the sense that they can receive packets from outside ND 400A and forward packets outside of ND 400A; VNE 470A.1 is coupled with VNE 470H.1, and thus they communicate packets between their respective NDs; VNE 470A.2-470A.3 may optionally forward packets between themselves without forwarding them outside of the ND 400A; and VNE 470A.P may optionally be the first in a chain of VNEs that includes VNE 470A.Q followed by VNE 470A.R (this is sometimes referred to as dynamic service chaining, where each of the VNEs in the series of VNEs provides a different service—e.g., one or more layer 4-7 network services). While FIG. 4C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 4A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 4A may also host one or more such servers (e.g., in the case of the general purpose network device 404, one or more of the virtual machines 462A-R may operate as servers; the same would be true for the hybrid network device 406; in the case of the special-purpose network device 402, one or more such servers could also be run on a hypervisor executed by the compute resource(s) 412); in which case the servers are said to be co-located with the VNEs of that ND.

Figure 4D:
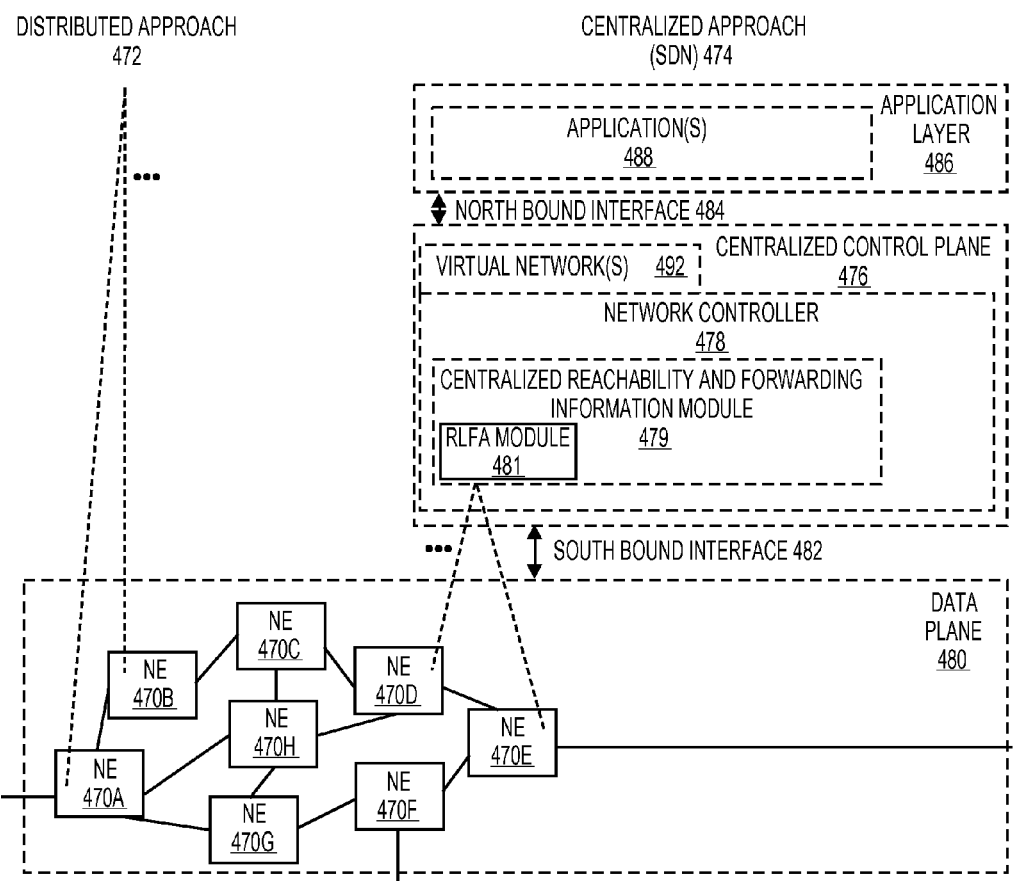
FIG. 4D illustrates a network with a single network element (NE) on each of the NDs of FIG. 4A, and within this straight forward approach contrasts a traditional distributed approach (commonly used by traditional routers) with a centralized approach for maintaining reachability and forwarding information (also called network control), according to some embodiments of the invention.

FIG. 4D illustrates a network with a single network element on each of the NDs of FIG. 4A, and within this straight forward approach contrasts a traditional distributed approach (commonly used by traditional routers) with a centralized approach for maintaining reachability and forwarding information (also called network control), according to some embodiments of the invention. Specifically, FIG. 4D illustrates network elements (NEs) 470A-H with the same connectivity as the NDs 400A-H of FIG. 4A.

FIG. 4D illustrates that the distributed approach 472 distributes responsibility for generating the reachability and forwarding information across the NEs 470A-H; in other words, the process of neighbor discovery and topology discovery is distributed.

For example, where the special-purpose network device 402 is used, the control communication and configuration module(s) 432A-R of the ND control plane 424 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 470A-H (e.g., the compute resource(s) 412 executing the control communication and configuration module(s) 432A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 424. The ND control plane 424 programs the ND forwarding plane 426 with information (e.g., adjacency and route information) based on the routing structure(s). For example, the ND control plane 424 programs the adjacency and route information into one or more forwarding table(s) 434A-R (e.g., Forwarding Information Base (FIB), Label Forwarding Information Base (LFIB), and one or more adjacency structures) on the ND forwarding plane 426. For layer 2 forwarding, the ND can store one or more bridging tables that are used to forward data based on the layer 2 information in that data. While the above example uses the special-purpose network device 402, the same distributed approach 472 can be implemented on the general purpose network device 404 and the hybrid network device 406.

FIG. 4D illustrates that a centralized approach 474 (also known as software defined networking (SDN)) that decouples the system that makes decisions about where traffic is sent from the underlying systems that forwards traffic to the selected destination. The illustrated centralized approach 474 has the responsibility for the generation of reachability and forwarding information in a centralized control plane 476 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 476 has a south bound interface 482 with a data plane 480 (sometime referred to the infrastructure layer, network forwarding plane, or forwarding plane (which should not be confused with a ND forwarding plane)) that includes the NEs 470A-H (sometimes referred to as switches, forwarding elements, data plane elements, or nodes). The centralized control plane 476 includes a network controller 478, which includes a centralized reachability and forwarding information module 479 that determines the reachability within the network and distributes the forwarding information to the NEs 470A-H of the data plane 480 over the south bound interface 482 (which may use the OpenFlow protocol). Thus, the network intelligence is centralized in the centralized control plane 476 executing on electronic devices that are typically separate from the NDs.

For example, where the special-purpose network device 402 is used in the data plane 480, each of the control communication and configuration module(s) 432A-R of the ND control plane 424 typically include a control agent that provides the VNE side of the south bound interface 482. In this case, the ND control plane 424 (the compute resource(s) 412 executing the control communication and configuration module(s) 432A-R) performs its responsibility for participating in controlling how data (e.g., packets) is to be routed (e.g., the next hop for the data and the outgoing physical NI for that data) through the control agent communicating with the centralized control plane 476 to receive the forwarding information (and in some cases, the reachability information) from the centralized reachability and forwarding information module 479 (it should be understood that in some embodiments of the invention, the control communication and configuration module(s) 432A-R, in addition to communicating with the centralized control plane 476, may also play some role in determining reachability and/or calculating forwarding information—albeit less so than in the case of a distributed approach; such embodiments are generally considered to fall under the centralized approach 474, but may also be considered a hybrid approach).

In one embodiment, the centralized reachability and forwarding information module 479 can implement an RLFA module 481 or a set of such modules to improve the efficiency in calculation of backup paths across the network. The RLFA module 481 can be implemented as part of the centralized reachability and forwarding information module 479 or similarly implemented as a part of a network controller 478 at the centralized controller 476 such that computation of the backup paths nodes in the data plane can be computed in conjunction with centralized computation of primary paths and backup paths using LFA algorithms.

While the above example uses the special-purpose network device 402, the same centralized approach 474 can be implemented with the general purpose network device 404 (e.g., each of the VNE 460A-R performs its responsibility for controlling how data (e.g., packets) is to be routed (e.g., the next hop for the data and the outgoing physical NI for that data) by communicating with the centralized control plane 476 to receive the forwarding information (and in some cases, the reachability information) from the centralized reachability and forwarding information module 479; it should be understood that in some embodiments of the invention, the VNEs 460A-R, in addition to communicating with the centralized control plane 476, may also play some role in determining reachability and/or calculating forwarding information—albeit less so than in the case of a distributed approach) and the hybrid network device 406. In fact, the use of SDN techniques can enhance the NFV techniques typically used in the general purpose network device 404 or hybrid network device 406 implementations as NFV is able to support SDN by providing an infrastructure upon which the SDN software can be run, and NFV and SDN both aim to make use of commodity server hardware and physical switches.

FIG. 4D also shows that the centralized control plane 476 has a north bound interface 484 to an application layer 486, in which resides application(s) 488. The centralized control plane 476 has the ability to form virtual networks 492 (sometimes referred to as a logical forwarding plane, network services, or overlay networks (with the NEs 470A-H of the data plane 480 being the underlay network)) for the application(s) 488. Thus, the centralized control plane 476 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 4D shows the distributed approach 472 separate from the centralized approach 474, the effort of network control may be distributed differently or the two combined in certain embodiments of the invention. For example: 1) embodiments may generally use the centralized approach (SDN) 474, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 474, but may also be considered a hybrid approach.

While FIG. 4D illustrates the simple case where each of the NDs 400A-H implements a single NE 470A-H, it should be understood that the network control approaches described with reference to FIG. 4D also work for networks where one or more of the NDs 400A-H implement multiple VNEs (e.g., VNEs 430A-R, VNEs 460A-R, those in the hybrid network device 406). Alternatively or in addition, the network controller 478 may also emulate the implementation of multiple VNEs in a single ND. Specifically, instead of (or in addition to) implementing multiple VNEs in a single ND, the network controller 478 may present the implementation of a VNE/NE in a single ND as multiple VNEs in the virtual networks 492 (all in the same one of the virtual network(s) 492, each in different ones of the virtual network(s) 492, or some combination). For example, the network controller 478 may cause an ND to implement a single VNE (a NE) in the underlay network, and then logically divide up the resources of that NE within the centralized control plane 476 to present different VNEs in the virtual network(s) 492 (where these different VNEs in the overlay networks are sharing the resources of the single VNE/NE implementation on the ND in the underlay network).

Figures 4E, 4F:
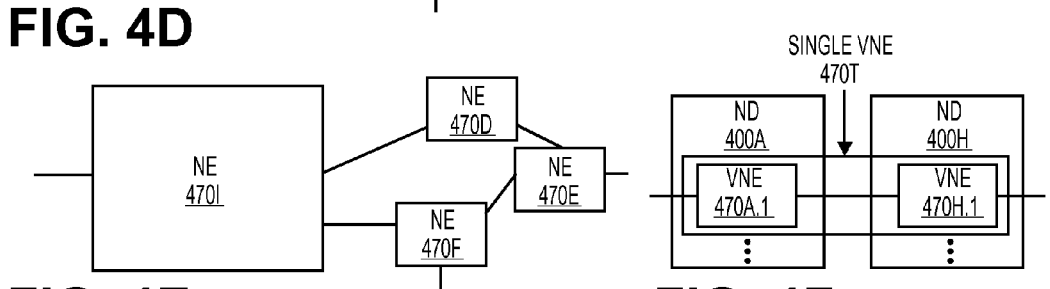
FIG. 4E illustrates the simple case of where each of the NDs 400A-H implements a single NE 470A-H (see FIG. 4D), but the centralized control plane 476 has abstracted multiple of the NEs in different NDs (the NEs 470A-C and G-H) into (to represent) a single NE 4701 in one of the virtual network(s) 492 of FIG. 4D, according to some embodiments of the invention.
FIG. 4F illustrates a case where multiple VNEs (VNE 470A.1 and VNE 470H.1) are implemented on different NDs (ND 400A and ND 400H) and are coupled to each other, and where the centralized control plane 476 has abstracted these multiple VNEs such that they appear as a single VNE 470T within one of the virtual networks 492 of FIG. 4D, according to some embodiments of the invention.

On the other hand, FIGS. 4E and 4F respectively illustrate exemplary abstractions of NEs and VNEs that the network controller 478 may present as part of different ones of the virtual networks 492. FIG. 4E illustrates the simple case of where each of the NDs 400A-H implements a single NE 470A-H (see FIG. 4D), but the centralized control plane 476 has abstracted multiple of the NEs in different NDs (the NEs 470A-C and G-H) into (to represent) a single NE 4701 in one of the virtual network(s) 492 of FIG. 4D, according to some embodiments of the invention. FIG. 4E shows that in this virtual network, the NE 4701 is coupled to NE 470D and 470F, which are both still coupled to NE 470E.

FIG. 4F illustrates a case where multiple VNEs (VNE 470A.1 and VNE 470H.1) are implemented on different NDs (ND 400A and ND 400H) and are coupled to each other, and where the centralized control plane 476 has abstracted these multiple VNEs such that they appear as a single VNE 470T within one of the virtual networks 492 of FIG. 4D, according to some embodiments of the invention. Thus, the abstraction of a NE or VNE can span multiple NDs.

While some embodiments of the invention implement the centralized control plane 476 as a single entity (e.g., a single instance of software running on a single electronic device), alternative embodiments may spread the functionality across multiple entities for redundancy and/or scalability purposes (e.g., multiple instances of software running on different electronic devices).

Figure 5:
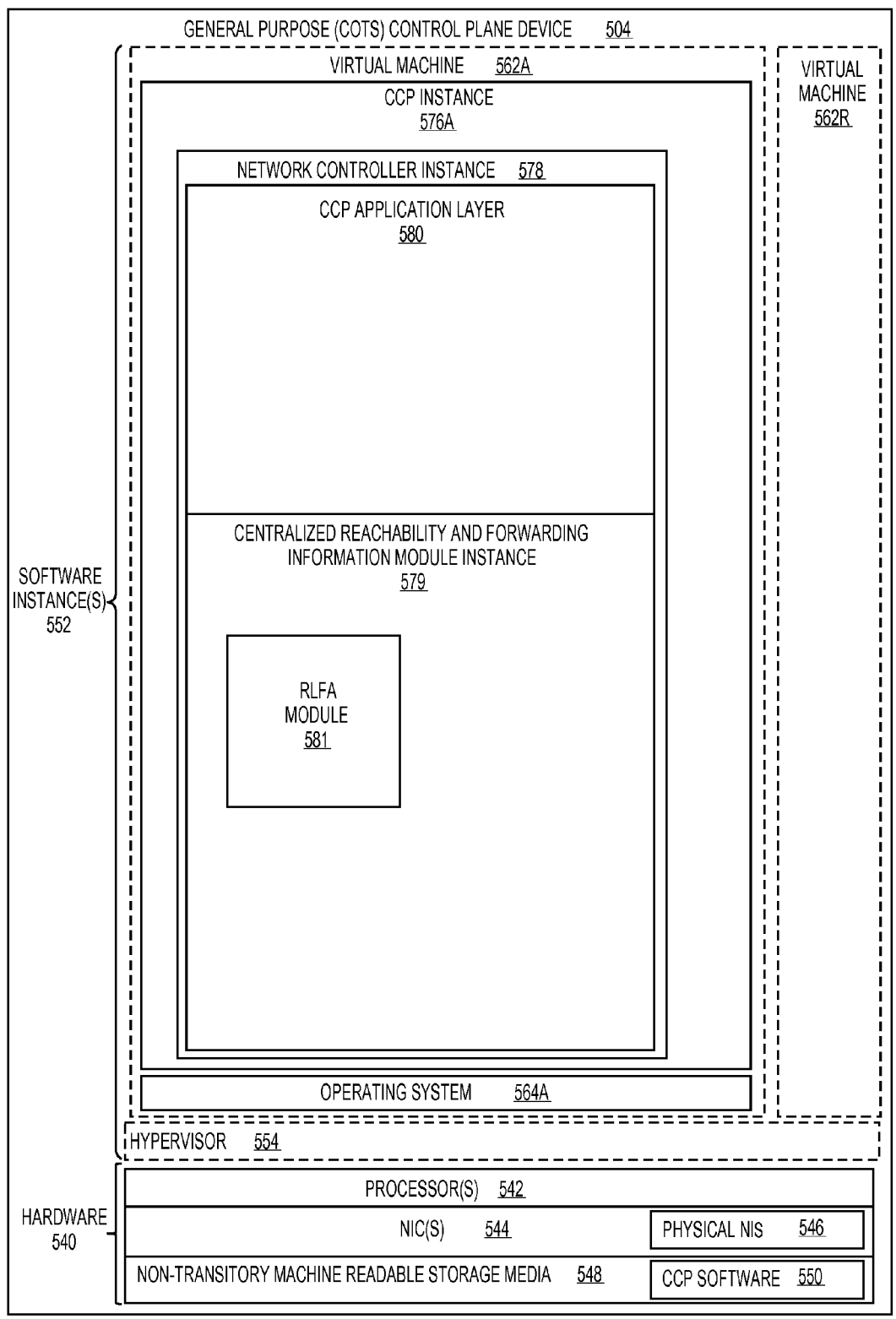
FIG. 5 illustrates a general purpose control plane device 504 including hardware 540 comprising a set of one or more processor(s) 542 (which are often Commercial off-the-shelf (COTS) processors) and network interface controller(s) 544 (NICs; also known as network interface cards) (which include physical NIs 546), as well as non-transitory machine readable storage media 548 having stored therein centralized control plane (CCP) software 550), according to some embodiments of the invention.

Similar to the network device implementations, the electronic device(s) running the centralized control plane 476, and thus the network controller 478 including the centralized reachability and forwarding information module 479, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 5 illustrates, a general purpose control plane device 504 including hardware 540 comprising a set of one or more processor(s) 542 (which are often COTS processors) and network interface controller(s) 544 (NICs; also known as network interface cards) (which include physical NIs 546), as well as non-transitory machine readable storage media 548 having stored therein centralized control plane (CCP) software 550.

In embodiments that use compute virtualization, the processor(s) 542 typically execute software to instantiate a hypervisor 554 (sometimes referred to as a virtual machine monitor (VMM)) and one or more virtual machines 562A-R that are run by the hypervisor 554; which are collectively referred to as software instance(s) 552. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 550 (illustrated as CCP instance 576A) on top of an operating system 564A are typically executed within the virtual machine 562A. In embodiments where compute virtualization is not used, the CCP instance 576A on top of operating system 564A is executed on the "bare metal" general purpose control plane device 504.

The operating system 564A provides basic processing, input/output (I/O), and networking capabilities. In some embodiments, the CCP instance 576A includes a network controller instance 578. The network controller instance 578 includes a centralized reachability and forwarding information module instance 579 (which is a middleware layer providing the context of the network controller 478 to the operating system 564A and communicating with the various NEs), and an CCP application layer 580 (sometimes referred to as an application layer) over the middleware layer (providing the intelligence required for various network operations such as protocols, network situational awareness, and user-interfaces). At a more abstract level, this CCP application layer 580 within the centralized control plane 476 works with virtual network view(s) (logical view(s) of the network) and the middleware layer provides the conversion from the virtual networks to the physical view.

In one embodiment, the centralized reachability and forwarding information module instance 579 can implement an RLFA module 481 or a set of such modules to improve the efficiency in calculation of backup paths across the network. The RLFA module 481 can be implemented as part of the centralized reachability and forwarding information module instance 579 or similarly implemented as a part of a network controller instance 578 at the CCP instance 576A such that computation of the backup paths nodes in the data plane can be computed in conjunction with centralized computation of primary paths and backup paths using LFA algorithms.

The centralized control plane 476 transmits relevant messages to the data plane 480 based on CCP application layer 580 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 480 may receive different messages, and thus different forwarding information. The data plane 480 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 480, the packet (or a subset of the packet header and content) is typically forwarded to the centralized control plane 476. The centralized control plane 476 will then program forwarding table entries into the data plane 480 to accommodate packets belonging to the flow of the unknown packet. Once a specific forwarding table entry has been programmed into the data plane 480 by the centralized control plane 476, the next packet with matching credentials will match that forwarding table entry and take the set of actions associated with that matched entry.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method implemented by a network device in a network having a plurality of nodes, the method to compute a remote loop free alternative (RLFA) next hop as a backup for a primary path next hop, where the method improves RLFA computation efficiency for a Q-Space list of nodes in a Q-space for an endpoint node by reducing calculations of a loop free condition for a path from a source node to a destination node via a tunnel between the source node and the endpoint node, where Q-space is a set of nodes from which a specific node can be reached without any path transiting a protected link or protected node, the method comprising the steps of:
selecting a next candidate node having a least distance to the endpoint node or destination node from a candidate list;
selecting a next neighbor node of the candidate node;
adding the neighbor node to a poison list where the candidate node is in the poison list and the neighbor node is not in the candidate list, the poison list indicating that a node is not a candidate for Q-Space; and
determining the Q-Space list by removing nodes from the poison list from the plurality of nodes.

2. The method of claim 1, further comprising the step of: initializing a set of optimal distances, the poison list, the candidate list and the Q-space list, where the poison list is initialized with the source node or the endpoint node.

3. The method of claim 1, further comprising the step of: adding the neighbor node to the poison list where the candidate node is in the poison list and a distance from the neighbor node to the endpoint or destination node is greater or equal to a sum of the distance from the candidate node to the endpoint or destination node and a link cost from the neighbor node to the candidate node.

4. The method of claim 1, further comprising the step of: removing the neighbor node from the poison list where the candidate node is not in the poison list and a distance from the neighbor node to the endpoint or destination node is greater than a sum of the distance from the candidate node to the endpoint/destination node and a link cost from the neighbor node to the candidate node.

5. The method of claim 1, further comprising the step of: adding the neighbor node to the poison list if it is the source node.

6. The method of claim 1, further comprising the step of: setting a distance from the neighbor node to the endpoint node to be equal to the sum of the distance from the candidate node to the endpoint node with link cost from neighbor node to the candidate node.

7. A network device in a network having a plurality of nodes, the network device configured to execute a method to compute a remote loop free alternative (RLFA) next hop as a backup for a primary path next hop, where the method improves RLFA computation efficiency for a Q-Space list of nodes in a Q-space for an endpoint node by reducing calculations of a loop free condition for a path from a source node to a destination node via a tunnel between the source node and the endpoint node, where Q-space is a set of nodes from which a specific node can be reached without any path transiting a protected link or protected node, the network device comprising:
a non-transitory machine-readable storage medium to store an RLFA module; and
a network processor communicatively coupled to the non-transitory machine-readable storage medium, the network processor to execute the RLFA module, the RLFA module configured to select a next candidate node having a least distance to the endpoint node or destination node from a candidate list, to select a next neighbor node of the candidate node, add the neighbor node to a poison list where the candidate node is in the poison list and the neighbor node is not in the candidate list, the poison list indicating that a node is not a candidate for Q-Space, and to determine the Q-Space list by removing nodes from the poison list from the plurality of nodes.

8. The network device of claim 7, wherein the network processor is further configured to execute the RLFA module that is configured to initialize a set of optimal distances, the poison list, the candidate list and the Q-space list, where the poison list is initialized with the source node or the endpoint node.

9. The network device of claim 7, wherein the network processor is further configured to execute the RLFA module that is configured to add the neighbor node to the poison list where the candidate node is in the poison list and a distance from the neighbor node to the endpoint or destination node is greater or equal to a sum of the distance from the candidate node to the endpoint or destination node and a link cost from the neighbor node to the candidate node.

10. The network device of claim 7, wherein the network processor is further configured to execute the RLFA module that is configured to remove the neighbor node from the poison list where the candidate node is not in the poison list and a distance from the neighbor node to the endpoint or destination node is greater than a sum of the distance from the candidate node to the endpoint/destination node and a link cost from the neighbor node to the candidate node.

11. The network device of claim 7, wherein the network processor is further configured to execute the RLFA module that is configured to add the neighbor node to the poison list if it is the source node.

12. The network device of claim 7, wherein the network processor is further configured to execute the RLFA module that is configured to check whether a distance between the neighbor node and endpoint node is less than a distance from the neighbor node to the endpoint node to be equal to a sum of a distance from the candidate node to the endpoint node with link cost from neighbor node to the candidate node, and set a distance from the neighbor node to the endpoint node to be equal to the sum of the distance from the candidate node to the endpoint node with link cost from neighbor node to the candidate node.

13. A control plane device configured to implement at least one centralized control plane for a software defined network (SDN) having a plurality of nodes, the centralized control plane configured to execute a method to compute a remote loop free alternative (RLFA) next hop as a backup for a primary path next hop, where the method improves RLFA computation efficiency for a Q-Space list of nodes in a Q-space for an endpoint node by reducing calculations of a loop free condition for a path from a source node to a destination node via a tunnel between the source node and the endpoint node, where Q-space is a set of nodes from which a specific node can be reached without any path transiting a protected link or protected node, the control plane device comprising:
a non-transitory machine-readable storage medium to store an RLFA module; and
a computer processor communicatively coupled to the non-transitory machine-readable storage medium, the computer processor to execute the RLFA module, the RLFA module configured to select a next candidate node having a least distance to the endpoint node or destination node from a candidate list, to select a next neighbor node of the candidate node, add the neighbor node to a poison list where the candidate node is in the poison list and the neighbor node is not in the candidate list, the poison list indicating that a node is not a candidate for Q-Space, and to
determine the Q-Space list by removing nodes from the poison list from the plurality of nodes.

14. The control plane device of claim 13, wherein the computer processor is further configured to execute the RLFA module that is configured to initialize a set of optimal distances, the poison list, the candidate list and the Q-space list, where the poison list is initialized with the source node or the endpoint node.

15. The control plane device of claim 13, wherein the computer processor is further configured to execute the RLFA module that is configured to add the neighbor node to the poison list where the candidate node is in the poison list and a distance from the neighbor node to the endpoint or destination node is greater or equal to a sum of the distance from the candidate node to the endpoint or destination node and a link cost from the neighbor node to the candidate node.

16. The control plane device of claim 13, wherein the computer processor is further configured to execute the RLFA module that is configured to remove the neighbor node from the poison list where the candidate node is not in the poison list and a distance from the neighbor node to the endpoint or destination node is greater than a sum of the distance from the candidate node to the endpoint/destination node and a link cost from the neighbor node to the candidate node.

17. The control plane device of claim 13, wherein the computer processor is further configured to execute the RLFA module that is configured to add the neighbor node to the poison list if it is the source node.

18. The control plane device of claim 13, wherein the computer processor is further configured to execute the RLFA module that is configured to check whether a distance between the neighbor node and endpoint node is less than a distance from the neighbor node to the endpoint node to be equal to a sum of a distance from the candidate node to the endpoint node with link cost from neighbor node to the candidate node, and set a distance from the neighbor node to the endpoint node to be equal to the sum of the distance from the candidate node to the endpoint node with link cost from neighbor node to the candidate node.

19. A computing device in a network having a plurality of nodes, the computing device implementing a plurality of virtual machines for implementing network function virtualization (NFV), wherein a virtual machine from the plurality of virtual machines is configured to execute a method to compute a remote loop free alternative (RLFA) next hop as a backup for a primary path next hop, where the method improves RLFA computation efficiency for a Q-Space list of nodes in a Q-space for an endpoint node by reducing calculations of a loop free condition for a path from a source node to a destination node via a tunnel between the source node and the endpoint node, where Q-space is a set of nodes from which a specific node can be reached without any path transiting a protected link or protected node, the computing device comprising:
 a non-transitory machine-readable storage medium to store the virtual machine and an RLFA module; and
 a computer processor communicatively coupled to the non-transitory machine-readable storage medium, the computer processor to execute the virtual machine, the virtual machine to execute the RLFA module, the RLFA module configured to select a next candidate node having a least distance to the endpoint node or destination node from a candidate list, to select a next neighbor node of the candidate node, add the neighbor node to a poison list where the candidate node is in the poison list and the neighbor node is not in the candidate list, the poison list indicating that a node is not a candidate for Q-Space, and to determine the Q-Space list by removing nodes from the poison list from the plurality of nodes.

20. The computing device of claim 19, wherein the computer processor is further configured to execute the RLFA module that is configured to initialize a set of optimal distances, the poison list, the candidate list and the Q-space list, where the poison list is initialized with the source node or the endpoint node.

21. The computing device of claim 19, wherein the computer processor is further configured to execute the RLFA module that is configured to add the neighbor node to the poison list where the candidate node is in the poison list and a distance from the neighbor node to the endpoint or destination node is greater or equal to a sum of the distance from the candidate node to the endpoint or destination node and a link cost from the neighbor node to the candidate node.

22. The computing device of claim 19, wherein the computer processor is further configured to execute the RLFA module that is configured to remove the neighbor node from the poison list where the candidate node is not in the poison list and a distance from the neighbor node to the endpoint or destination node is greater than a sum of the distance from the candidate node to the endpoint/destination node and a link cost from the neighbor node to the candidate node.

23. The computing device of claim 19, wherein the computer processor is further configured to execute the RLFA module that is configured to add the neighbor node to the poison list if it is the source node.

24. The computing device of claim 19, wherein the computer processor is further configured to execute the RLFA module that is configured to check whether a distance between the neighbor node and endpoint node is less than a distance from the neighbor node to the endpoint node to be equal to a sum of a distance from the candidate node to the endpoint node with link cost from neighbor node to the candidate node, and set a distance from the neighbor node to the endpoint node to be equal to the sum of the distance from the candidate node to the endpoint node with link cost from neighbor node to the candidate node.

* * * * *